Figures 1, 2:
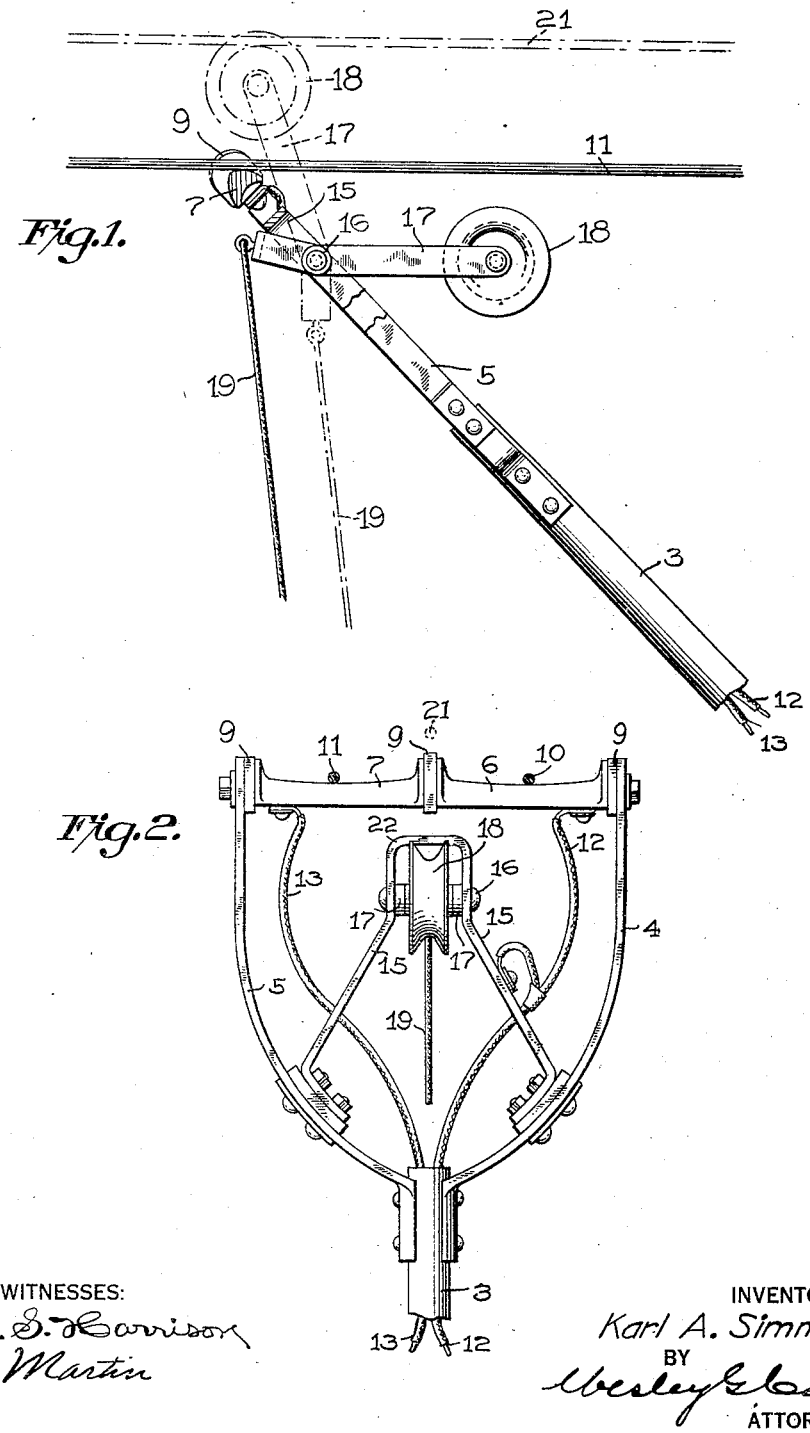

Nov. 16, 1926.

K. A. SIMMON 1,606,815

CURRENT COLLECTOR

Filed Jan. 13, 1922

WITNESSES:
R. S. Harrison
A. Martin

INVENTOR
Karl A. Simmon
BY
Wesley G. Carr
ATTORNEY

Patented Nov. 16, 1926.

1,606,815

UNITED STATES PATENT OFFICE.

KARL A. SIMMON, OF EDGEWOOD PARK, PENNSYLVANIA, ASSIGNOR TO WESTINGHOUSE ELECTRIC & MANUFACTURING COMPANY, A CORPORATION OF PENNSYLVANIA.

CURRENT COLLECTOR.

Application filed January 13, 1922. Serial No. 529,001.

My invention relates to current collectors and particularly to collectors for use in connection with trackless trolleys.

My invention has for its object the provision of means whereby an auxiliary current collector may be conveniently mounted upon a trolley pole, or other suitable structure, that is employed for supporting the main current collectors.

In using trackless-trolley busses, it is sometimes found desirable to house them in the ordinary trolley-car barns, as where the trolley bus serves as a feeder for the ordinary trolley line. To do this, it may be necessary to drive the bus parallel to the car tracks and thereby utilize the single conductor or trolley wire.

On trolley busses, especially of the type wherein two collectors are mounted upon a single pole, it is necessary to provide an auxiliary collector for conducting current from the usual single trolley wire, due to the fact that neither of the two collectors used during normal operation could properly co-operate with an ordinary single-line trolley wire.

As shown in the accompanying drawing:

Figure 1 is a view, partially in side elevation and partially in section, of a portion of a trolley pole and the current collectors supported thereby, and Fig. 2 is a plan view thereof.

A trolley pole 3 is mounted upon a vehicle, not shown, and is normally biased upwardly in the usual manner. The pole 3 is provided with arms 4 and 5 that carry, at their upper ends, a pair of current collectors 6 and 7, respectively, that are insulated from each other and from the arms 4 and 5, by means of blocks 9 of any suitable insulating material.

The current collectors 6 and 7 engage wires 10 and 11, respectively, to complete a circuit through a conductor 12 to apparatus within the vehicle (not shown) and back through conductor 13 to the collector 7 and the trolley wire 11.

A yoke 15 is secured to the arms 4 and 5 and is provided with a pin 16 upon which a lever 17 is mounted. The lever 17 carries a trolley wheel 18 at one end and is provided with a rope 19 by means of which the trolley wheel may be manipulated from the ground. The yoke 15 is suitably insulated from the arms 4 and 5.

When the end of the line composed of the trolley wires 10 and 11 is reached, it may be desirable to use the auxiliary collector 18 in connection with a single trolley wire 21. The operator pulls on the rope 19 and thereby throws the wheel 18 to the position shown by the dotted lines in Fig. 1, and current is then conducted from the trolley wire 21 through the wheel 18 and the conductor 12 to the apparatus within the vehicle and thence to the ground through a shoe that may slide along one of the rails of a street car track.

In order to move the trolley wheel 18 to an inoperative position, it is only necessary for the operator to go to the rear of the car and pull on the rope 19. This will move the wheel 18 a sufficient distance forward to permit it to fall, by the action of gravity, to the position indicated in full lines in Fig. 1.

The upper end 22 of the yoke 15 serves as a stop member to limit the movement of the lever 17 about its pivot 16. It will be seen that the upper or front edges of the portion 22 of the yoke is engaged by the lever 17 when the trolley wheel 18 is in operative position and that the lower or rear edge of the yoke will be engaged by the lever 17 when the trolley wheel 18 lies in its inoperative position.

Various modifications may be made in detail and general arrangements without departing from the spirit and scope of the invention, as indicated in the accompanying claims.

I claim as my invention:

1. The combination with a trolley pole, of a pair of laterally spaced current collectors rigidly secured thereto and a third current collector supported by the pole for pivotal movement, with respect to the pole, in substantially a vertical longitudinal plane.

2. The combination with a trolley pole, of a pair of laterally spaced current collectors rigidly secured thereto and an auxiliary current collector supported for pivotal movement between the first named collectors, relative to said pole.

3. The combination with a trolley pole, of a pair of laterally spaced current collectors rigidly secured thereto and an auxiliary current collector supported between the first named collectors, the auxiliary collector being movable relatively to the pole.

4. The combination with a trolley pole, of a pair of laterally spaced current collectors rigidly secured thereto and an auxiliary current collector supported between the first named collectors, the auxiliary collector being supported for movement relatively to the pole, in a vertical plane.

5. The combination with a trolley pole, of a pair of current collectors rigidly secured thereto and an auxiliary current collector also supported thereby and movable with respect to said first named current collectors.

6. The combination with a plurality of trolley wires, of a trolley pole, a plurality of current collectors mounted on said pole, and means for moving the centrally disposed collector into and out of operative position with respect to one of the wires.

7. The combination with a plurality of trolley wires, of a trolley pole provided with a pair of laterally spaced arms, a pair of laterally spaced current collectors supported by said arms, an auxiliary current collector supported between said arms, and means for moving the said auxiliary collector into and out of engagement with one of the wires.

In testimony whereof, I have hereunto subscribed my name this 4th day of January, 1922.

KARL A. SIMMON.